United States Patent [19]
Hyde et al.

[11] Patent Number: 5,557,397
[45] Date of Patent: Sep. 17, 1996

[54] AIRCRAFT-BASED TOPOGRAPHICAL DATA COLLECTION AND PROCESSING SYSTEM

[75] Inventors: Russell T. Hyde, Helena; Michael G. Wise; Robert H. Stokes, both of Birmingham; Edward C. Brasher, Jr., Pelham, all of Ala.

[73] Assignee: Airborne Remote Mapping, Inc., Bessemer, Ala.

[21] Appl. No.: 310,164

[22] Filed: Sep. 21, 1994

[51] Int. Cl.$^6$ ................................................. G01C 3/08
[52] U.S. Cl. ................................................. 356/5.01; 356/2
[58] Field of Search ........................................ 356/2, 5.01

[56] References Cited

U.S. PATENT DOCUMENTS

| | | | |
|---|---|---|---|
| 3,546,375 | 12/1970 | Vitt, Jr. | 343/17 |
| 4,708,472 | 11/1987 | Hofmann | 356/2 |
| 5,191,385 | 3/1993 | Kasser | 356/5 |

OTHER PUBLICATIONS

"Aircraft Applications of GPS-Based Altitude Determination", Cohen et al, Institute of Navigation, GPS 1992, Albuquerque NM Sep. 1992.

*Primary Examiner*—Mark Hellner
*Attorney, Agent, or Firm*—Thad G. Long

[57] ABSTRACT

A system is described for rapidly and accurately determining the topography of land masses as well as individual x,y,z coordinates of discrete targets. The system incorporates a laser altimeter, a laser scanning/steering system with sensor for receiving reflected laser beams, a global positioning system or other non-ground-based reference means, a video camera, computers, and processing software. The system, mounted to an aircraft, selectively scans or steers a pulsed laser altimeter over a swath or point on earth. A Global Positioning System (GPS) or other non-ground-based reference means records the aircraft's position, altitude, and time of position. Concurrently, a computer system records and time tags the laser's range, scanner angles, and airborne platform's roll, pitch, and heading. The processing software correlates all events and measurements using time to determine precise x,y,z coordinates of the ground/targets. Finally, the system post processes the combined data to produce significant terrain, vegetation, and cultural data.

34 Claims, 6 Drawing Sheets

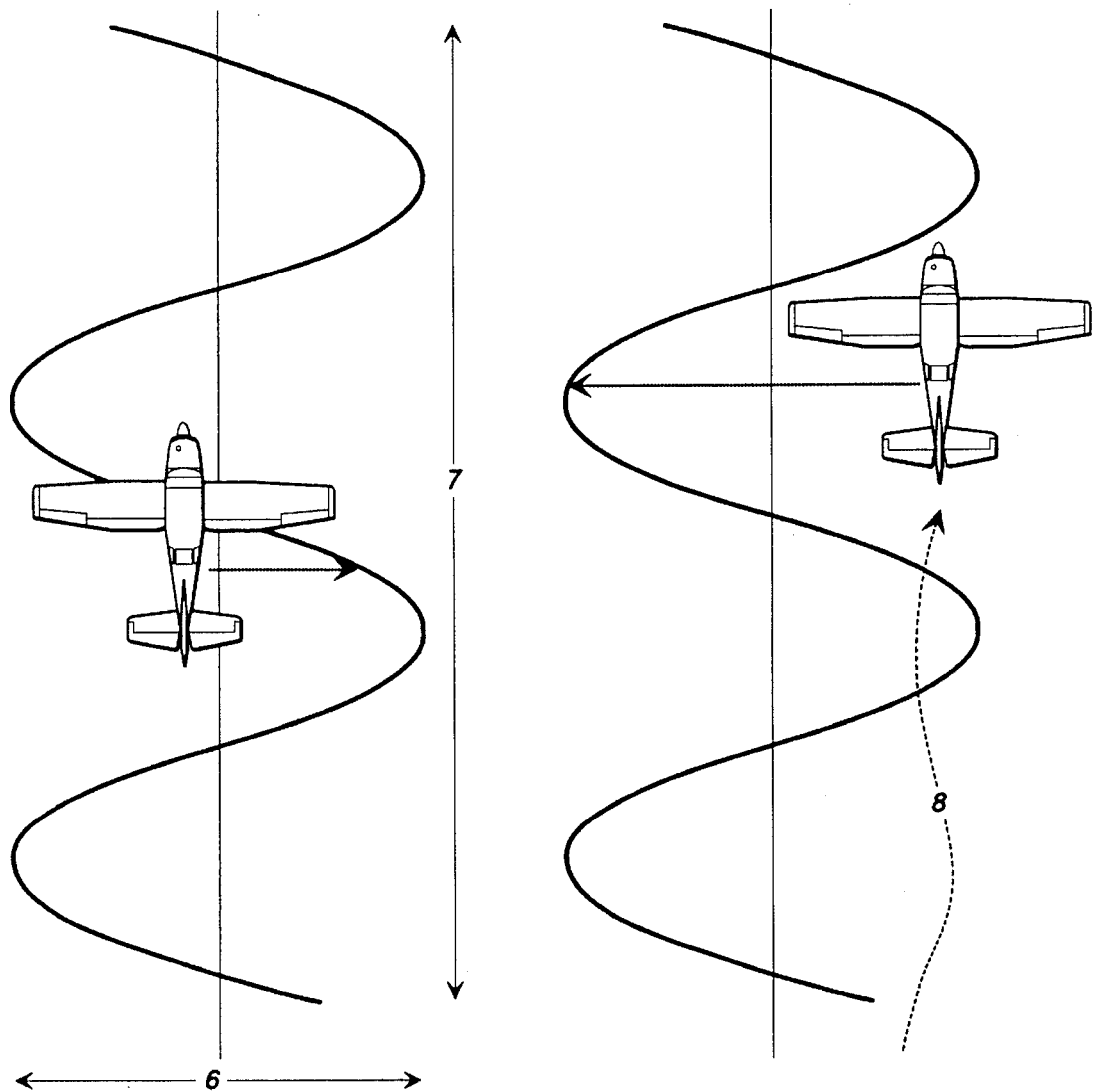
FIG. 2    FIG. 3

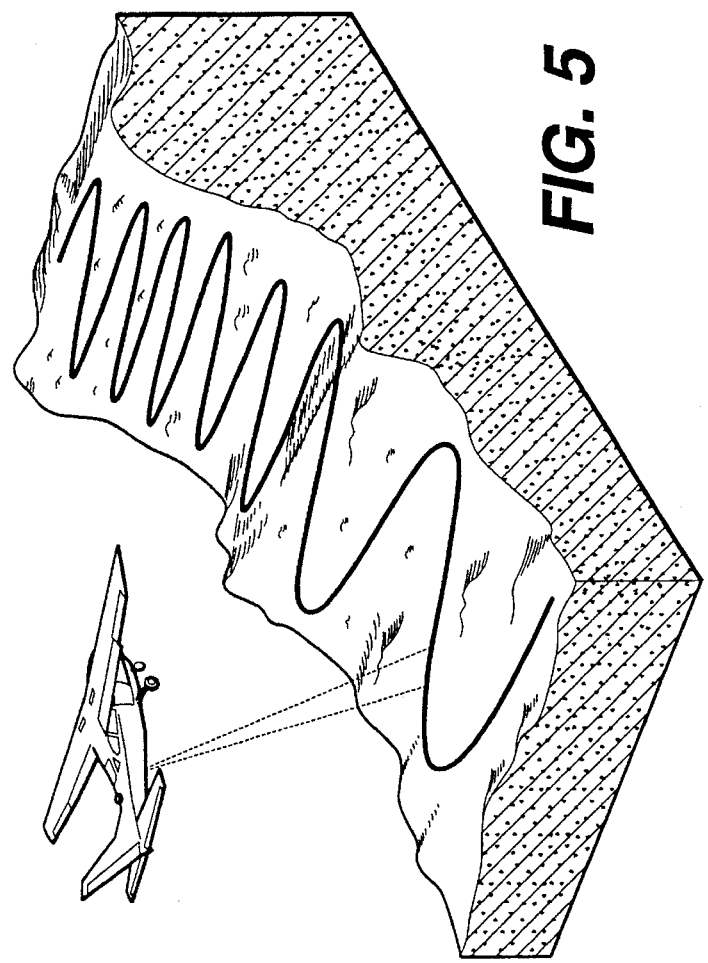
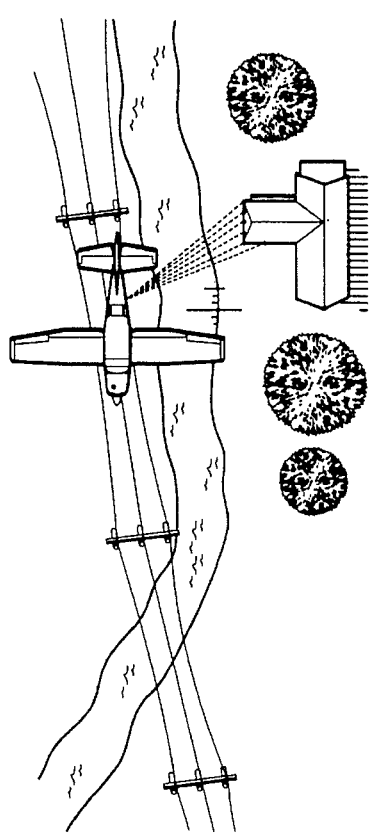
FIG. 5
FIG. 4

AIRCRAFT-BASED TOPOGRAPHICAL DATA COLLECTION AND PROCESSING SYSTEM

DESCRIPTION OF THE PRIOR ART

A. PROBLEMS IN INDUSTRY

Land and asset management is a vital part of civilization. Map making (cartography), defense, and natural resource management depend on accurate and timely topographical and earth coordinate information. Ways are constantly being sought to improve the accuracy and timeliness of collecting this information.

B. SOLUTIONS BY OTHER PEOPLE

There are currently several ways topographical information is collected. The most well known and oldest method of obtaining topographical information is by hand survey. Modern survey crews, much as early surveyors did hundreds of years ago, use transits, tape measures, and previously surveyed ground control points. These surveyors literally walk the land to collect topographical information. With the advent of aviation came photogrammatry. Photogrammatry essentially requires that stereographic photos be taken from the air of the intended target areas. Then, on the ground, the pictures are developed and through a stereographic viewer topographical information is extracted.

Recently, within the last twenty years, there have been several attempts to improve the topographical data collection process by taking advantage of lasers and aircraft. Two systems use a laser and photographic film mounted to an aircraft to produce topographical contour lines (U.S. Pat. Nos. 3,527,533 and 3,743,418). Another system takes advantage of the doppler effect to determine aircraft altitude and thus indirectly determine topographical information (U.S. Pat. No. 4,130,360). By far the most numerous attempts to improve topographical data collection use a combination of ground and air systems (U.S. Pat. Nos. 4,168,524 3,741,653 5,191,385 3,766,312 4,203,665 and 3,918,172).

C. SHORTCOMINGS OF OTHER SOLUTIONS

As technology has progressed so have the survey tools. Unfortunately, the progress has been limited to the improvement of previous tools. Instead of using a tape measure to measure distance, a hand-held laser can now measure distance. Instead of a survey monument, a gps position is used, neither of which alone significantly improves or speeds the topographical data collection process.

Several systems of the prior art improve topographical data collection in several areas, yet fall short in others.

The contour line systems (U.S. Pat. Nos. 3,527,533 and 3,743,418) have three shortcomings in their present design. First, these systems cannot distinguish between the ground, brush/trees, and cultural returns. They simply contour what is beneath the platform, and consequently the topographical contours could err significantly. Second, the resolution of the system is determined by the contour interval. Third, no method has been articulated to determine a precise location in geodetic space for the contours.

The ground tethered systems (U.S. Pat. Nos. 4,168,524 3,741,653 5,191,385 3,766,312 4,203,665 and 3,918,172) have one major shortcoming in common. These systems require the use of one or more ground control points. This tethering to ground control points severely limits the flexibility and speed of topographical data collection. In essence, the aircraft must operate within a specific range to the ground control point(s). These ground control point(s) must be set up by hand. If collecting topographical data from the outer reaches of Alaska, a survey team would still be required to set up a point to within a specific range of the intended survey area. The most promising of these systems is U.S. Pat. No. 4,168,524. It is claimed that it can operate for limited periods of time out of range from its ground control points because it employs an inertial reference system. Unfortunately, the time out of range is severely limited by the inherent "drift" error produced by the inertial reference system. Nonetheless, the system requires the use of ground control points for initialization and periodic updates.

OBJECT OF THE INVENTION

It is the object of the invention rapidly and accurately to collect topographic data of land masses as well as the individual x,y,z coordinates of discrete targets to include: 1) Collection of data completely independent of ground control points. 2) Multi-mode scanning\steering to collect data of broad areas as well as individual points. 3) Processing collected topographical data to discern between the ground, vegetation, and cultural items.

SUMMARY OF THE INVENTION

A topographic data collection system, in accordance with the present invention, incorporates a laser altimeter, a laser scanning/steering system and a sensor to receive laser beams reflected back to the aircraft, a global positioning system or other non-ground-based reference means (such as an inertial navigation system), a central computer, processing software, and video camera.

The laser altimeter provides the distance data from the platform to the target to the central computer. These data are in units of hundredths of meters.

The laser altimeter beam is fired through a beam scanning\steering system. The beam scanning\steering system will allow the operator to: (a) produce a variable width sinusoidal scan pattern of the laser altimeter on the ground; (b) steer the variable width sinusoidal pattern in a single axis to maintain a desired centerline; and (c) steer a non-scanning laser altimeter beam to track specific targets. The steering/scanning system provides the central computer with beam angles relative to the aircraft's reference plane. These beam angles will be used to determine the vector of the laser altimeter beam relative to the aircraft.

During operation of the system, a Global Position System (GPS) provides the central computer with platform position, altitude, roll, pitch, and heading. The GPS time tags these data for later collation. Although cost considerations presently limit the practical utility of an extremely accurate inertial navigation system (as an alternative to a GPS) to expensive vehicles (such as a space satellite or space shuttle) such inertial navigation system is a conceptionally feasible system which would not be dependent upon a ground-based reference.

As the central computer receives the distance data, the central computer system tags the data with an absolute time. The computer allows the operator to set scan limits, types of scan, steering control, pulse recurrence frequency of the laser altimeter, and pulse processing features.

After data collection, the data are processed to produce topographical data including but not limited to x,y,z coordinates, surfaces, and target features. For each laser pulse, the system computes a latitude, longitude, and altitude (x,y,z). This topographical point can be converted to any coordinate system desired. When all laser pulses have been processed, the aggregate total is digitally processed/filtered to derive terrain, vegetation, and cultural features.

GENERAL DISCUSSION OF DRAWINGS

FIG. 1 is a perspective view showing the aircraft over the area to be surveyed.

FIGS. 2, 3, and 4 show plan views of the different scan and steering patterns possible for the laser altimeter.

FIG. 5 is a perspective view of the gimbal lock scan pattern on the ground.

DETAILED DISCUSSION OF DRAWINGS

Figure 1:
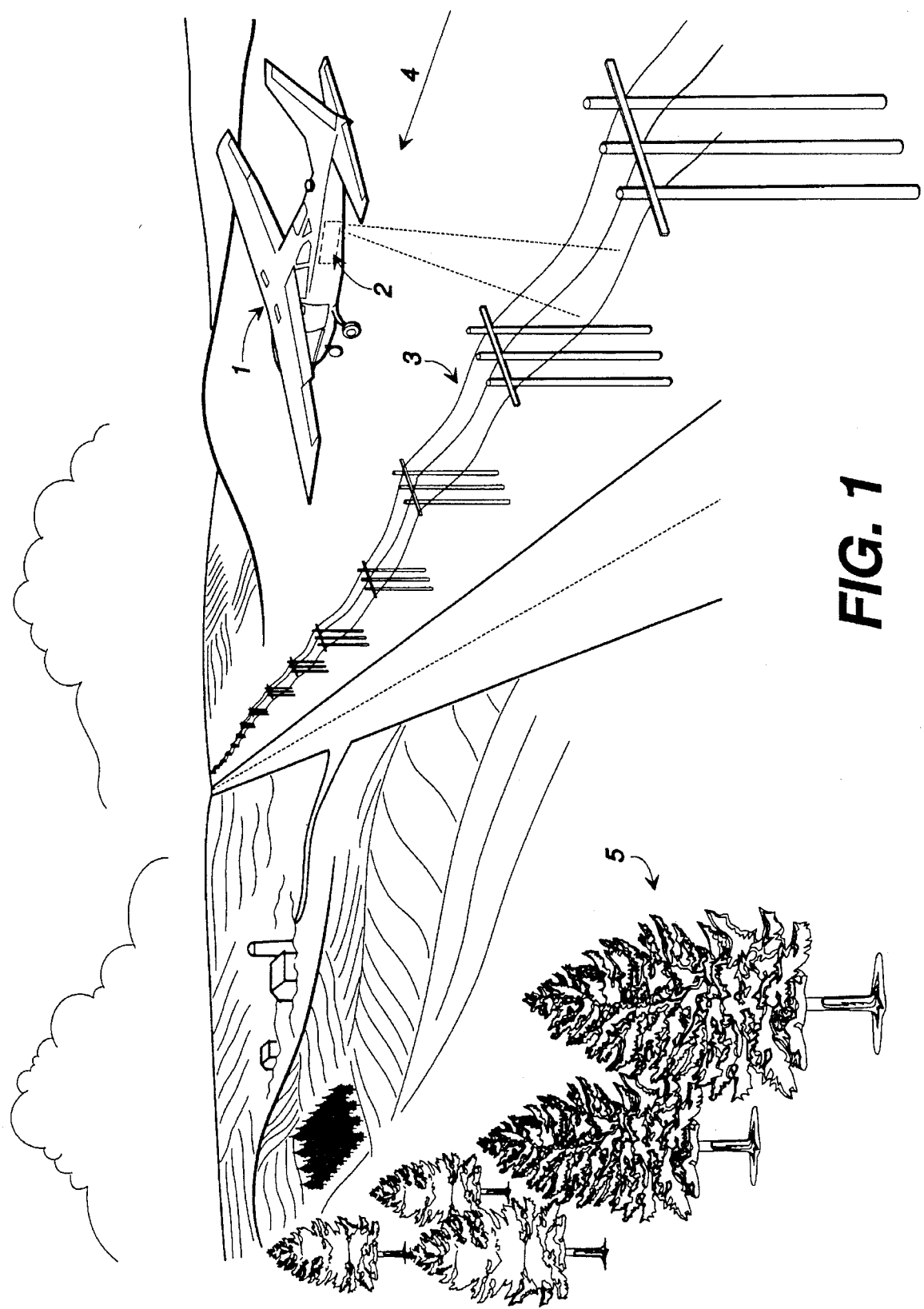

Referring to FIG. 1, an airborne platform 1, typically a light single engine aircraft, carrying the topographical mapping system 2, will overfly the area that is to be surveyed. The system will map and collect data on cultural features 3, terrain 4, and vegetation 5. This system does not require the use of a ground control point. This system derives its positional information from a Global Positioning System (GPS), and thus not limited to a particular area.

FIGS. 2, 3, and 4 show the different patterns or movement the beam scanner/steerer can produce on the surface below the aircraft. FIG. 2 shows the pattern produced by the system comprising the invention in a completely autonomous mode ("gimbal lock mode") without any manual directing of the beam. This mode requires the least operator input and is most suited for wide area surveying. The width of the scan pattern 6 is pre-selectable to best optimize data collection. The forward translation of the pattern 7 is produced by the air-craft's forward movement. FIG. 3 shows a typical pattern produced by the system when the left/right displacement of the beam is controlled by the operator, i.e., single axis of freedom (centerline tracking mode). This mode is employed when the operator desires to keep the center of the scan along the centerline of a particular target, e.g., along power lines, roads, rivers and tree lines, and independent of the aircraft's varying displacement 8 from target centerline. Also, the width of the scan is selectable to optimize data collection requirements. FIG. 4 shows the results of steering the beam both side-to-side and front-to-back, i.e., about two axes of freedom (target tracking mode). The operator, through a video camera that is boresighted with the laser, and to which the laser is slaved, steers the beam onto the desired target. Here the operator has two-axis control of the laser beam. This mode is desirable when data are required of specific targets in discrete locations, such as particular power line poles, open pits, and bridges.

FIG. 5 is a perspective illustration of the three-dimensional pattern produced by the system when operated in the gimbal lock mode.

Figure 6:
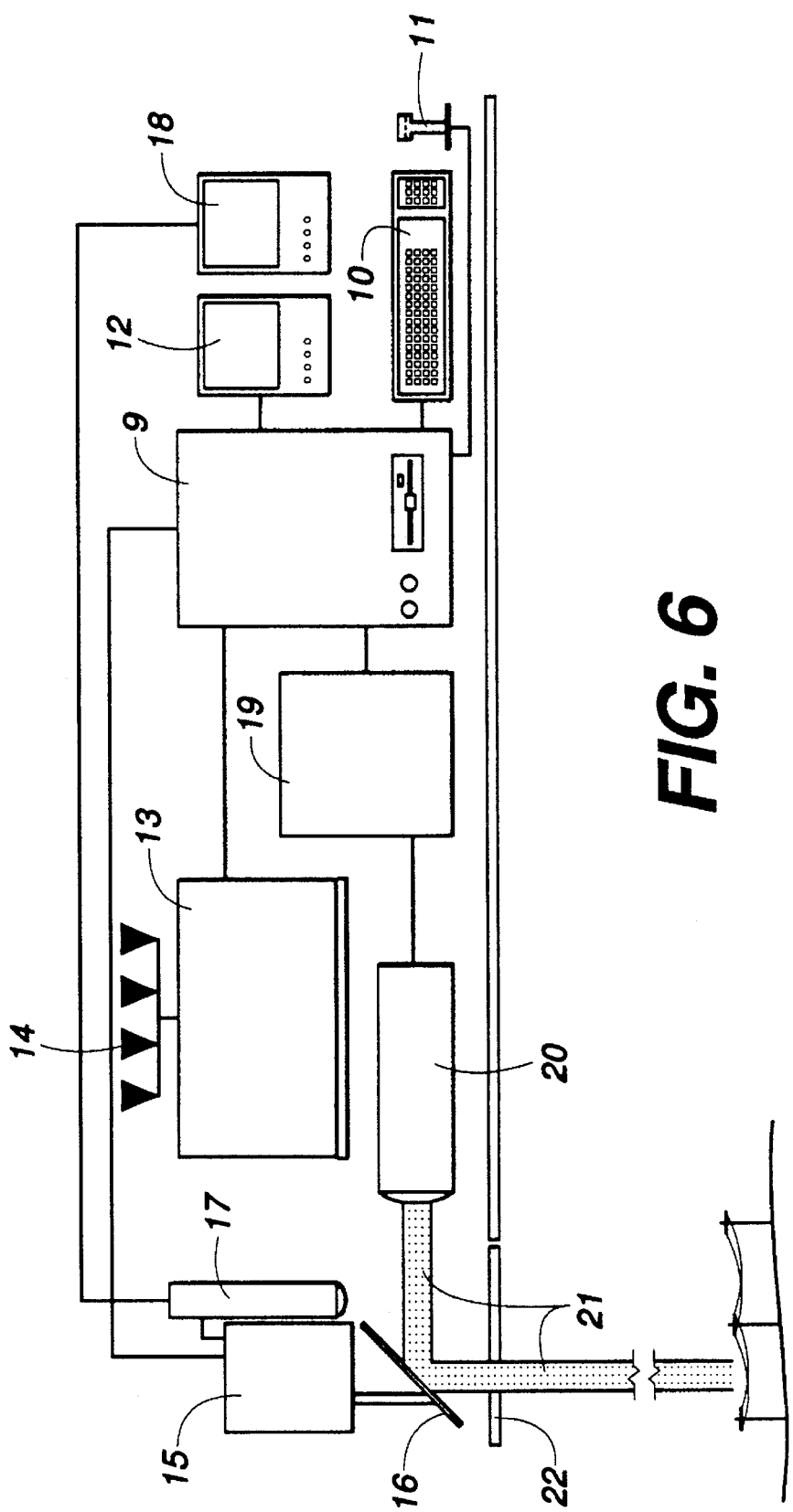
FIG. 6 is an illustration of the signal paths of the system.

Referring to FIG. 6, once the aircraft approaches the target survey area, the operator will initialize the central computer 9. Once initialized, the computer will perform diagnostics and built in tests (BIT) of itself and the attached equipment. After the satisfactory completion of all diagnostics and tests, the computer is programmed to ask for several pieces of data:

A) Mode of operation:
  i) gimbal locked
  ii) centerline tracking
  iii) target tacking
B) If gimbal locked or centerline tracking is selected, then the desired scan width in degrees and scan rate in Hz.
C) Desired pulse recurrence frequency (PRF) of the laser.
D) First pulse/last pulse operation.
E) Rolling range gate yes/no The operator interface is through the keyboard 10, joy stick 11, and monitor 12. After these questions are answered the computer configures itself and other subsystems for operation. A computer mouse, track ball or similar means may be utilized instead of a joy stick.

Once a data run has staffed, the central computer sends a start command to the GPS 13. The GPS 13 then begins to compute platform position, altitude, heading, roll, pitch, and time. The GPS antenna array 14 provides a reference plane for aircraft roll, pitch, and heading. One of the antennas in the array is used to calculate position. The GPS 13 sends the central computer 9 time tagged aircraft roll, pitch, heading, altitude, and position data at a two hertz rate.

Depending on the scanning/steering mode selected, the central computer 9 will send positioning commands to the gimbal 15 and mirror 16. The position feedback is telling the central computer 9 the actual gimbal 15 and mirror 16 positions. In the gimbal lock mode, the gimbal 15 is aligned and locked with the aircraft's 0° pitch angle so that it is slaved to the aircraft's pitch movement. The mirror 16 scans at a preselected oscillation rate and scan width. Also, the camera 17 is boresighted with the pitch gimbal and mirror scan centerline. This mode does not require the operator to track specific targets or specific linear configurations such as highways and power lines. In the centerline tracking mode, the operator tracks the desired ground centerline using a joy stick 11, video camera 17, and video monitor 18. The operator uses the joy stick 11 to keep the camera 17 centered on the desired centerline during variations in the flight path. The center of the mirror scan is aligned with the camera's center of view, so that the center of the laser sweep is coincident with the camera's center of view. In this mode of operation the operator is able to compensate for variations in the flight profile due to drift, heading errors and similar variations. In the target tracking mode, gimbal 15 follows the movements of the camera 17. This allows the operator to obtain spot information on specific targets.

During a data run the central computer 9 will, at the selected pulse recurrence frequency, send the laser altimeter controller 19 a command to fire the laser. In turn, the laser altimeter controller 19 will fire the laser 20. The pulse from the laser 20 will travel from the laser 20 to the mirror 16 along a path 21 through the optical window 22. The pulse will strike the target and return along a path 21 through the optical window 22 to the mirror 16 and back to the laser 20. The return signal from the laser 20 is fed to the laser altimeter controller 19. The laser altimeter controller 19 computes distance based on time of flight of the laser pulse. The distance is then fed to the central computer 9. When the central computer 9 receives the distance data, it stamps it with time and stores it.

Figure 7:
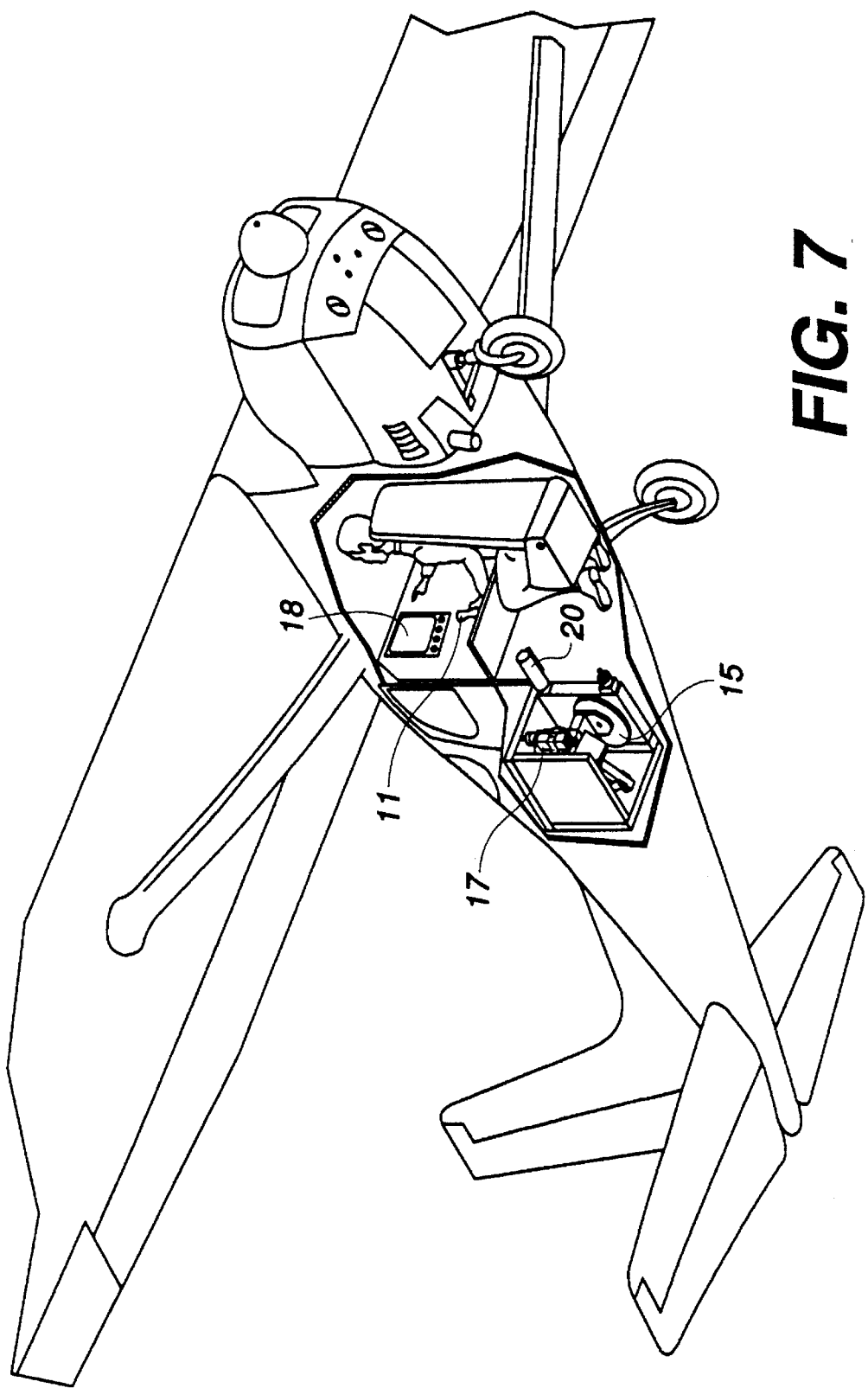
FIG. 7 is an illustration of the laser scanning components in the context of the aircraft.
Figure 8:
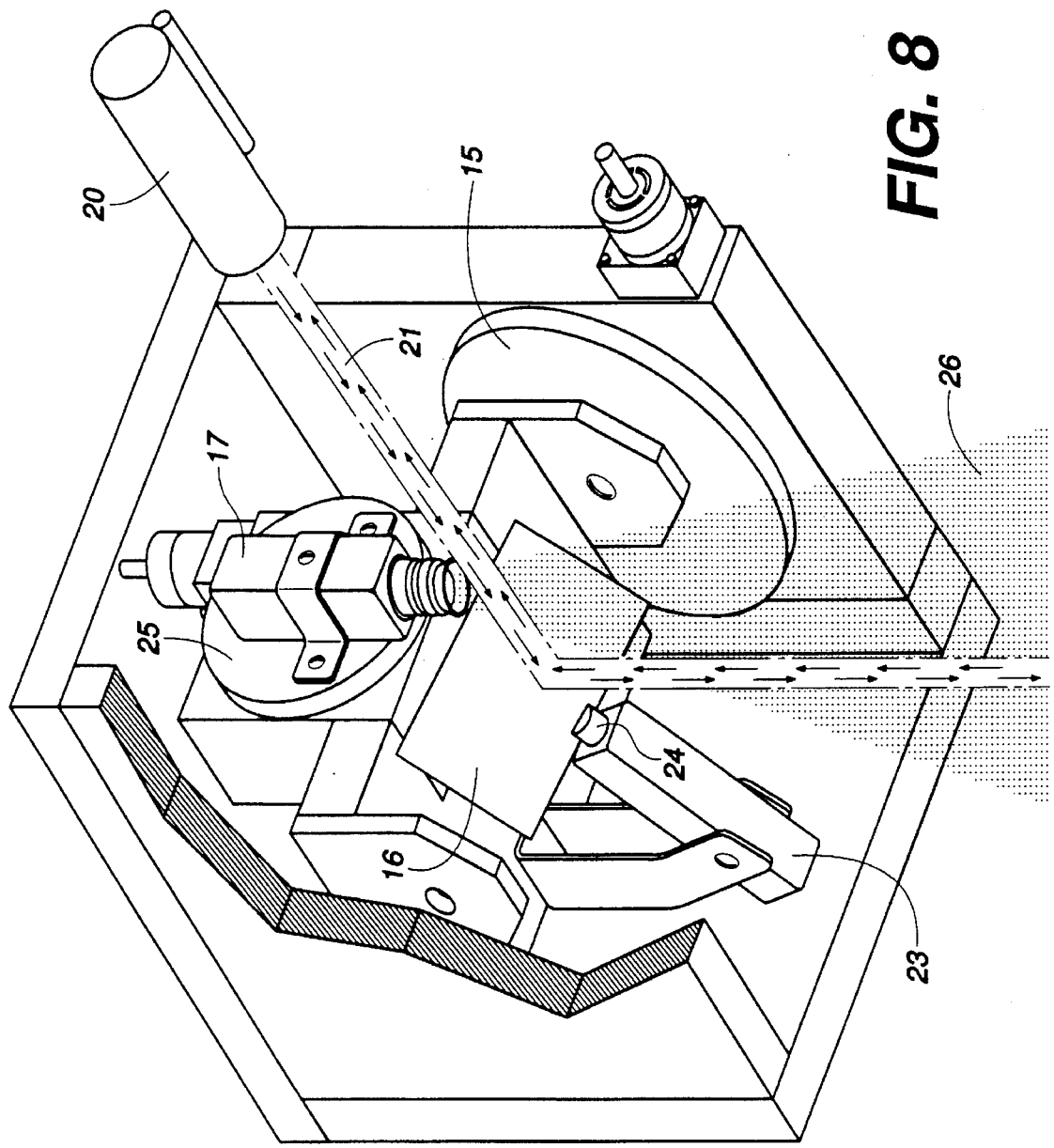
FIG. 8 is an exploded view of the laser/camera configuration and steering platform.

FIGS. 7 and 8 illustrate the preferred embodiment for the laser scanner. The laser pulse will follow the path 21 from the laser 20 to the mirror 16, to the target, back to the mirror 16, and finally ending at the laser receiver or sensor 20. The path of the beam is controlled several ways. In the gimbal locked mode, the pitch gimbal 15 is locked to 0° pitch angle relative to the aircraft. The mirror 16 is oscillated side-toside about the aircraft centerline by the mirror scanner 23 via swivel 24. The scan frequency and amplitude is selected by the operator. In the centerline tracking mode, the operator has one axis control of the laser beam. The pitch gimbal 15 is locked to 0° pitch angle relative to the aircraft. The mirror 16 is oscillated side-to-side about an angle slaved to a video camera 17. The operator tracks the target's centerline with a video camera 17, by moving a joy stick 11, computer mouse, track ball or similar operator-control device, which in turn drives the video camera's gimbal 25, The mirror 16 then oscillates side-to-side about the video camera's displacement angle. This one axis of freedom allows target centerlines to be tracked without overly burdening the operator and/or pilot. In the target tracking mode, the operator has two-axis control of the laser beam. The pitch gimbal 15 and the camera gimbal 25 are slaved to the joy stick. The operator uses the joy stick 11 to keep the target centered in the camera's field of view 26. The mirror 16 does not oscillate but rather is slaved to the video camera 17. In essence, the laser beam 21 is targeted through the center of the camera's field of view 26. This two-axis-of-freedom allows the collection of concentrated data on specific discrete targets.

After the data collection mission is complete, the data are post processed.

The collected data reside in four files, an attitude file, a position and altitude file, an angle file, and a range file. The attitude file contains the data on the aircraft's attitude which was collected at a rate of not substantially less than one Hz. This includes platform roll, pitch, and heading. All the data are time stamped. The position and altitude file contains the aircraft's position and altitude data. These data are also time stamped. The angle data file contains the angle data from the gimbals and mirror which is collected on a per pulse basis and is time stamped. The range data file contains the ranging information from the aircraft to the ground. These data are collected on a per pulse basis and are time stamped.

The four data files are collated and merged for each laser pulse based on time. The first step is to build a single dimension array for each laser pulse comprising a single datum for each critical item of information from each data file. The array will contain: time, range from laser to target, gimbal angle, mirror angle, aircraft roll angle, aircraft pitch angle, aircraft heading, and aircraft position. The second step is to fill in the array with the per pulse data. This includes: time, range from laser to target, gimbal angle, and mirror angle. The third step is to interpolate and fill in the other data. These data include: aircraft roll angle, aircraft pitch angle, aircraft heading, and aircraft position. The third-step interpolated data are based on the assumption that the aircraft is held in relatively unaccelerated flight during data runs. Since actual non-interpolated data readings are taken multiple numbers of times per second, errors in the intervening intervals, due to the interpolation of data whose accuracy may be distorted by aircraft acceleration during the interval, are negligible.

After the data are collated and merged, discrete x,y,z points are computed for each laser pulse. This process involves using spherical geometry and computing vectors, given the lengths and included angles, and utilizing classical trigonometric concepts.

Next, the points are filtered for outliers. This includes stripping points for ranges outside range gates, velocities too fast or slow, and positions out of range.

After the data have been collated, merged, and filtered they are ready for feature extraction. Up to three types of data can be produced: terrain data, vegetation data, and cultural data. The terrain data are data delineating the actual ground surface. These data are produced by low pass filtering the master data set and producing an emphasized ground surface. The vegetation data are data delineating the top surface of the vegetation. These data are produced by high pass filtering the master data and producing an emphasized top surface. Cultural data are data delineating cultural returns such as power lines, buildings, and roads. The filtering process looks for square, planar, and/or angular sharp surfaces.

What is claimed is:

1. An aircraft-based topographical data collection and processing system comprising: (1) a non-ground-based position reference means; (2) a laser beam originating from an aircraft in flight, manipulatable about at least one axis of freedom and directable toward a target; (3) a sensor to register range data from the laser beam reflected back to the aircraft; (4) a means for measuring and time stamping aircraft roll, pitch, and true heading data; and (5) a computer to time stamp, process and collate the aforesaid data to define target position, elevation, and physical and dimensional measurements.

2. An aircraft-based topographical data collection and processing system as described in claim 1 wherein the non-ground-based position reference means is a global positioning system.

3. An aircraft-based topographical data collection and processing system as described in claim 1 wherein the non-ground-based position reference means is an inertial navigation system.

4. An aircraft-based topographical data collection and processing system as described in claim 1 wherein the laser beam is electronically and mechanically slaved to a video camera directable about at least one axis by an operator-controlled means.

5. An aircraft based topographical data collection and processing system as described in claim 4 wherein the operator-controlled means is a joy stick.

6. An aircraft-based topographical data collection and processing system as described in claim 4 wherein the operator-controlled means is a computer mouse.

7. An aircraft-based topographical data collection and processing system as described in claim 4 wherein the operator-controlled means is a computer track ball.

8. An aircraft-based topographical data collection and processing system as described in claim 2 wherein the laser beam is electronically and mechanically slaved to a video camera directable about at least one axis by an operator-controlled means.

9. An aircraft-based topographical data collection and processing system as described in claim 8 wherein the operator-controlled means is a joy stick.

10. An aircraft-based topographical data collection and processing system as described in claim 8 wherein the operator-controlled means is a computer mouse.

11. An aircraft-based topographical data collection and processing system as described in claim 8 wherein the operator-controlled means is a computer track ball.

12. An aircraft-based topographical data collection and processing system as described in claim 3 wherein the laser beam is electronically and mechanically slaved to a video camera directable about at least one axis by an operator-controlled means.

13. An aircraft-based topographical data collection and processing system as described in claim 12 wherein the operator-controlled means is a joy stick.

14. An aircraft-based topographical data collection and processing system as described in claim 12 wherein the operator-controlled means is a computer mouse.

15. An aircraft-based topographical data collection and processing system as described in claim 12 wherein the operator-controlled means is a computer track ball.

16. An aircraft-based topographical data collection and processing system as described in claim 4 wherein the laser beam is reflected off a mirror which is rotatable about an axis generally parallel to the longitudinal axis of the aircraft.

17. An aircraft-based topographical data collection and processing system as described in claim 4 wherein the laser is reflected off a mirror which is rotatable about an axis generally perpendicular to the longitudinal axis of the aircraft.

18. An aircraft-based topographical data collection and processing system as described in claim 4 wherein the laser is reflected off a mirror which is rotatable about an axis generally parallel to the longitudinal axis of the aircraft and which is also rotatable about an axis generally perpendicular to the longitudinal axis of the aircraft.

19. An aircraft-based topographical data collection and processing system as described in claim 18 wherein the non-ground-based position reference means is a global positioning system.

20. An aircraft-based topographical data collection and processing system as described in claim 19 wherein the operator-controlled means is a joy stick.

21. An aircraft-based topographical data collection and processing system as described in claim 18 wherein the non-ground-based position reference means is an inertial navigation system.

22. An aircraft-based topographical data collection and processing system as described in claim 21 wherein the operator-controlled means is a joy stick.

23. An aircraft-based topographical data collection and processing system as described in claim 19 wherein the operator-controlled means is a computer mouse.

24. An aircraft-based topographical data collection and processing system as described in claim 19 wherein the operator-controlled means is a track ball.

25. An aircraft-based topographical data collection and processing system as described in claim 21 wherein the operator-controlled means is a computer mouse.

26. An aircraft-based topographical data collection and processing system as described in claim 21 wherein the operator-controlled means is a track ball.

27. An aircraft-based topographical data collection and processing system as described in claim 16 wherein the non-ground-based position reference means is a global positioning system.

28. An aircraft-based topographical data collection and processing system as described in claim 27 wherein the operator-controlled means is a joy stick.

29. An aircraft based topographical data collection and processing system as described in claim 27 wherein the operator-controlled means is a computer mouse.

30. An aircraft-based topographical data collection and processing system as described in claim 27 wherein the operator-controlled means is a track ball.

31. An aircraft-based topographical data collection and processing system as described in claim 16 wherein the non-ground-based position reference means is an inertial navigation system.

32. An aircraft-based topographical data collection and processing system as described in claim 31 wherein the operator-controlled means is a joy stick.

33. An aircraft-based topographical data collection and processing system as described in claim 31 wherein the operator-controlled means is a computer mouse.

34. An aircraft-based topographical data collection and processing system as described in claim 31 wherein the operator-controlled means is a track ball.

* * * * *